US012668251B2

(12) United States Patent
Park et al.

(10) Patent No.: US 12,668,251 B2
(45) Date of Patent: Jun. 30, 2026

(54) POWER CONTROL DEVICE AND VEHICLE HAVING THE SAME

(71) Applicants: Hyundai Motor Company, Seoul (KR); Kia Corporation, Seoul (KR); Kyungshin Corp., Incheon (KR)

(72) Inventors: Sehoon Park, Yongin-si (KR); Hyunsock Yi, Incheon (KR)

(73) Assignees: Hyundai Motor Company, Seoul (KR); Kia Corporation, Seoul (KR); Kyungshin Corp., Incheon (KR)

( * ) Notice: Subject to any disclaimer, the term of this patent is extended or adjusted under 35 U.S.C. 154(b) by 432 days.

(21) Appl. No.: 18/331,429

(22) Filed: Jun. 8, 2023

(65) Prior Publication Data

US 2024/0124001 A1     Apr. 18, 2024

(30) Foreign Application Priority Data

Oct. 17, 2022   (KR) ........................ 10-2022-0133072

(51) Int. Cl.
B60W 50/02        (2012.01)
B60R 16/023       (2006.01)
B60R 16/033       (2006.01)

(52) U.S. Cl.
CPC ..... B60W 50/0205 (2013.01); B60R 16/0232 (2013.01); B60R 16/033 (2013.01); B60W 2050/021 (2013.01); B60W 2510/242 (2013.01)

(58) Field of Classification Search
CPC ....... B60W 50/0205; B60W 2050/021; B60W 2510/242; B60W 60/0053; B60R 16/0232;

(Continued)

(56) References Cited

U.S. PATENT DOCUMENTS 5,835,873 A * 11/1998 Darby .................... B60R 21/01
180/268
6,150,734 A * 11/2000 Neibecker ........... B60R 16/0238
307/10.1

(Continued)

FOREIGN PATENT DOCUMENTS

KR      102027121 B1   10/2019
KR      20200022674 A   3/2020

OTHER PUBLICATIONS

Wikipedia: CAN bus, downloaded from Wayback machine Oct. 15, 2022 (Year: 2022).*

(Continued)

*Primary Examiner* — Kito R Robinson
*Assistant Examiner* — Tanya C Sienko
(74) *Attorney, Agent, or Firm* — Slater Matsil, LLP

(57) ABSTRACT

An embodiment power control device includes a power converter configured to convert a first voltage of a first battery to a second voltage lower than the first voltage of the first battery and to supply a power via the second voltage, a power distributor configured to distribute and supply the power supplied from the power converter to a plurality of low-power loads including an autonomous driving control device, and an integrated central control unit (ICU) configured to be connected to the power converter, the power distributor, and the autonomous driving control device through a plurality of communication networks, to determine a first failure in a first communication module provided in the power converter or a second failure in communication lines of the plurality of communication networks, and to transmit failure information about the first failure or the second failure to the autonomous driving control device.

20 Claims, 9 Drawing Sheets

(58) Field of Classification Search

CPC ...... B60R 16/033; B60L 3/00; B60L 2210/10; H04L 12/40039; H04L 43/0823; H04L 2012/40273

See application file for complete search history.

(56) References Cited

U.S. PATENT DOCUMENTS

| | | | | |
|---|---|---|---|---|
| 7,894,951 | B2 * | 2/2011 | Norris | B60T 7/22 |
| | | | | 180/443 |
| 11,673,578 | B2 * | 6/2023 | Sarkar | G05D 1/0214 |
| | | | | 701/23 |
| 2008/0089225 | A1 * | 4/2008 | Ammay | H04L 43/0811 |
| | | | | 370/216 |
| 2008/0100436 | A1 * | 5/2008 | Banting | H02J 13/00017 |
| | | | | 340/539.22 |
| 2011/0119517 | A1 * | 5/2011 | Beeco | H04L 41/12 |
| | | | | 713/340 |
| 2011/0288777 | A1 * | 11/2011 | Gupta | G06Q 10/06311 |
| | | | | 702/57 |
| 2013/0227103 | A1 * | 8/2013 | Garimella | H04L 41/5054 |
| | | | | 709/223 |
| 2016/0229298 | A1 * | 8/2016 | Chen | B60L 58/20 |
| 2017/0063151 | A1 * | 3/2017 | Freitag | H02J 3/14 |
| 2018/0001926 | A1 | 1/2018 | Swieter | |
| 2018/0304828 | A1 | 10/2018 | Kitani et al. | |
| 2020/0369227 | A1 * | 11/2020 | Park | H02M 3/155 |
| 2020/0406869 | A1 | 12/2020 | Hwang | |
| 2021/0122343 | A1 * | 4/2021 | Mehdizade | B60T 8/171 |
| 2021/0234767 | A1 * | 7/2021 | Ricci | G08G 1/096725 |
| 2021/0316742 | A1 * | 10/2021 | Hayes | G05B 19/0428 |
| 2023/0086986 | A1 * | 3/2023 | Park | B60W 60/00186 |
| | | | | 701/26 |
| 2023/0268733 | A1 * | 8/2023 | Reimann | H02J 1/10 |
| | | | | 307/18 |

OTHER PUBLICATIONS

"The Science Behind CAN Bus and Why It's Important to Monitor" by MadgeTech Marketing, Apr. 20, 2021, https://www.madgetech.com/posts/blogs/the-science-behind-can-bus-and-why-its-important-to-monitor/ (Year: 2021).*

"Powering multiple low voltage devices from one power supply?" (reddit/AskElectronics subreddit) 2020 (Year: 2020).*

"TI introduces industry's first 18-V multi-channel synchronous buck converter with PMBus digital interface" AutomationWorld, Mar. 30, 2015 (Year: 2015).*

"Monitoring System for Vehicle Power Supply Based on CAN Bus" by S. Wang et al., Eighth International Conference on Intelligent Systems Design and Applications. Nov. 26-28, 2008 (Year: 2008).*

Brown Car Guy "What Do These Dashboard Warning Lights Mean?! [Electric Cars & Hybrids]", YouTube video, 3:58 minutes long Sep. 7, 2022 https://youtu.be/NBEGZCw1Aiw?si=z8ZKg3E8e5ujHd9g (Year: 2022).*

* cited by examiner

FIG. 5

| FAILURE POINT | FAILURE TYPE | DETERMINATION DEVICE | FAILURE NOTIFICATION INFORMATION (AVC) |
|---|---|---|---|
| P1 | • COMMUNICATION HARDWARE FAILURE<br>• COMMUNICATION LINE DISCONNECTION | ICU | LDC TRANSMISSION FAILURE |
| P2 | C NETWORK<br>• ERROR, SHORT-CIRCUIT IN COMMUNICATION LINE | ICU | COMMUNICATION LINE FAILURE IN C NETWORK |
| P3 | ICU<br>• COMMUNICATION HARDWARE FAILURE<br>• COMMUNICATION LINE DISCONNECTION | SECOND OR THIRD DISTRIBUTOR | TRANSMISSION FAILURE IN B NETWORK, ICU |
| P4 | B NETWORK<br>• ERROR, SHORT-CIRCUIT IN COMMUNICATION LINE | AVC | COMMUNICATION LINE FAILURE IN B NETWORK |
| P5 | BMS<br>• COMMUNICATION HARDWARE FAILURE<br>• COMMUNICATION LINE DISCONNECTION | ICU | BMS TRANSMISSION FAILURE |
| P6 | L NETWORK<br>• ERROR, SHORT-CIRCUIT IN COMMUNICATION LINE | ICU | COMMUNICATION LINE FAILURE IN L NETWORK |

POWER CONTROL DEVICE AND VEHICLE HAVING THE SAME

CROSS-REFERENCE TO RELATED APPLICATIONS

This application claims the benefit of Korean Patent Application No. 10-2022-0133072, filed on Oct. 17, 2022, which application is hereby incorporated herein by reference.

TECHNICAL FIELD

The disclosure relates to a power control device and a vehicle having the same.

BACKGROUND

In addition to a basic driving function, vehicles perform additional functions for user convenience such as an audio function, a video function, a navigation function, an air conditioning function, a seat heater function, a communication function with external terminals, and the like.

As in-vehicle electronic devices, control devices, and multimedia devices increase, many cables are required to connect the various separate devices, which accounts for a significant portion of a weight and manufacturing cost of a vehicle and raises a quality issue and reliability reduction issue.

Accordingly, in order to reduce the amount of wiring and manufacturing cost, a controller area network (CAN) connecting a variety of in-vehicle devices to a single common network has been used.

That is, several controllers installed in a vehicle for performing independent functions are connected through a CAN communication bus (CAN_H)(CAN_L), and control information of each of the controllers is transmitted and received by a CAN communication module provided in each of the controllers, and thus the control information of each of the controllers may be shared. In this instance, while transmitting and receiving the control information, the control information may not be transmitted and received due to a failure in a CAN communication module hardware, disconnection/short circuit/error in a CAN communication line, and the like.

Therefore, a vehicle may not be actively controlled during autonomous driving control.

SUMMARY

The disclosure relates to a power control device and a vehicle having the same. Particular embodiments relate to a power control device for determining a communication failure and a vehicle having the same.

An embodiment of the disclosure provides a power control device and a vehicle having the same that may determine whether a failure occurs in a communication line connected to each of an integrated central control unit, a power converter, a battery management system, and a power distributor and may transmit information about the determined failure to an autonomous driving control device.

Another embodiment of the disclosure provides a power control device and a vehicle having the same that may determine whether a hardware failure occurs in a communication module of each of an integrated central control unit and a battery management system and whether a disconnection occurs in a communication line connected to the integrated central control unit and the battery management system.

Additional embodiments of the disclosure will be set forth in part in the description which follows and, in part, will be obvious from the description or may be learned by practice of the disclosure.

According to an embodiment of the disclosure, there is provided a power control device including a power converter configured to convert a voltage of a first battery to a voltage lower than the voltage of the first battery and supply a power of the converted voltage, a power distributor configured to distribute the power supplied from the power converter and supply to a plurality of low-power loads including an autonomous driving control device, and an integrated central control unit (ICU) configured to be connected to the power converter, the power distributor, and the autonomous driving control device through a plurality of communication networks, to determine a failure in a first communication module provided in the power converter and a failure in communication lines of the plurality of communication networks, and to transmit failure information about at least one failure to the autonomous driving control device.

According to an embodiment of the disclosure, the ICU is configured to be connected to the power converter through a first communication network of the plurality of communication networks, to identify a period of time that a message is not received from the power converter, and based on the identified period of time being greater than or equal to a set period of time, to determine that a hardware failure occurs in the first communication module or a disconnection occurs in a communication line connected to the first communication module.

According to an embodiment of the disclosure, the ICU is configured to be connected to a steering device and a brake device through a second communication network of the plurality of communication networks, to determine whether a communication line of the second communication network is in an error state based on a signal received through the second communication network, and based on a number of times determined as being the error state being greater than or equal to a set number, to determine that an error or a short-circuit occurs in the communication line of the second communication network.

According to an embodiment of the disclosure, the power distributor includes a first distributor configured to distribute the power supplied from the power converter, a second distributor configured to supply the power supplied from the first distributor to the autonomous driving control device, the steering device, and the brake device and to be connected to the ICU through a third communication network of the plurality of communication networks, and a third distributor configured to supply the power supplied from the second distributor to the autonomous driving control device, the steering device, and the brake device and to be connected to the ICU through the third communication network.

According to an embodiment of the disclosure, the third distributor is configured to identify a period of time that a message is not received from the ICU and, based on the identified period of time being greater than or equal to a set period of time, determine that a hardware failure occurs in a third communication module provided in the ICU or a disconnection occurs in a communication line connected to the third communication module.

According to an embodiment of the disclosure, based on the failure information about the at least one failure being received from the ICU, the third distributor is configured to transmit the received failure information about the at least one failure to the autonomous driving control device.

According to an embodiment of the disclosure, the power control device further includes a battery management system (BMS) including a second communication module connected to a fourth communication network of the plurality of communication networks and configured to control charging of a second battery using the power supplied from the power converter.

According to an embodiment of the disclosure, the ICU is configured to identify a period of time that a message is not received from the BMS and, based on the identified period of time being greater than or equal to a set period of time, determine that a hardware failure occurs in the second communication module or a disconnection occurs in a communication line connected to the second communication module.

According to an embodiment of the disclosure, the ICU is configured to determine whether a communication line of the fourth communication network is in an error state based on a signal received through the fourth communication network and, based on a number of times determined as being the error state being greater than or equal to a set number, determine that an error or a short-circuit occurs in the communication line of the fourth communication network.

According to another embodiment of the disclosure, there is provided a vehicle including a power converter configured to convert a voltage of a first battery to a voltage lower than the voltage of the first battery and supply a power of the converted voltage, a power distributor configured to distribute the power supplied from the power converter and supply to an autonomous driving control device, a steering device, and a brake device, a first communication network configured to be connected to the power converter, a second communication network configured to be connected to the brake device and the steering device, a third communication network configured to be connected to the autonomous driving control device and the power distributor, and an ICU configured to be connected to the first communication network, the second communication network, and the third communication network, to determine a failure in a first communication module provided in the power converter and a failure in communication lines of the first communication network, the second communication network, and the third communication network, and to transmit failure information about at least one failure to the autonomous driving control device. Based on the failure information about the at least one failure being received, the autonomous driving control device is configured to control display of the received failure information about the at least one failure and failure response information.

According to another embodiment of the disclosure, the ICU is configured to be connected to the power converter through the first communication network, to identify a period of time that a message is not received from the power converter, and based on the identified period of time being greater than or equal to a set period of time, to determine that a hardware failure occurs in the first communication module or a disconnection occurs in a communication line connected to the first communication module.

According to another embodiment of the disclosure, the ICU is configured to determine whether a communication line of the second communication network is in an error state based on a signal received through the second communication network and to determine that an error or a short-circuit occurs in the communication line of the second communication network based on a number of times determined as being the error state being greater than or equal to a set number.

According to another embodiment of the disclosure, the power distributor is configured to supply the power supplied from the power converter to the autonomous driving control device, the steering device, and the brake device, or to supply power from a second battery to the autonomous driving control device, the steering device, and the brake device.

According to another embodiment of the disclosure, the power distributor is configured to identify a period of time that a message is not received from the ICU and, based on the identified period of time being greater than or equal to a set period of time, determine that a hardware failure occurs in a third communication module provided in the ICU or a disconnection occurs in a communication line connected to the third communication module.

According to another embodiment of the disclosure, based on the failure information about the at least one failure being received from the ICU, the power distributor is configured to transmit the received failure information about the at least one failure to the autonomous driving control device.

According to another embodiment of the disclosure, the vehicle further includes a second battery, a BMS configured to control charging of the second battery using the power supplied from the power converter, and a fourth communication network connected to the BMS.

According to another embodiment of the disclosure, the ICU is configured to identify a period of time that a message is not received from the BMS and, based on the identified period of time being greater than or equal to a set period of time, determine that a hardware failure occurs in a second communication module provided in the BMS or a disconnection occurs in a communication line connected to the second communication module.

According to another embodiment of the disclosure, the ICU is configured to determine whether a communication line of the fourth communication network is in an error state based on a signal received through the fourth communication network and to determine that an error or a short-circuit occurs in the communication line of the fourth communication network based on the number of times the error state has been detected as being greater than or equal to a set number.

According to another embodiment of the disclosure, the autonomous driving control device is configured to control a power supply of the second battery based on a determination that the failure information about the at least one failure is failure information of communication with the power converter.

According to another embodiment of the disclosure, the autonomous driving control device is configured to determine whether a communication line of the third communication network is in an error state based on a signal received through the third communication network, to determine that an error or a short-circuit occurs in the communication line of the third communication network based on a number of times determined as being the error state being greater than or equal to a set number, and to hand over control of the vehicle to a user.

BRIEF DESCRIPTION OF THE DRAWINGS

These and/or other embodiments of the disclosure will become apparent and more readily appreciated from the following description of the embodiments, taken in conjunction with the accompanying drawings, in which:

FIG. 5 illustrates an example of a failure type, a determination device, and failure notification information by failure point;

DETAILED DESCRIPTION OF ILLUSTRATIVE EMBODIMENTS

Figure 1:
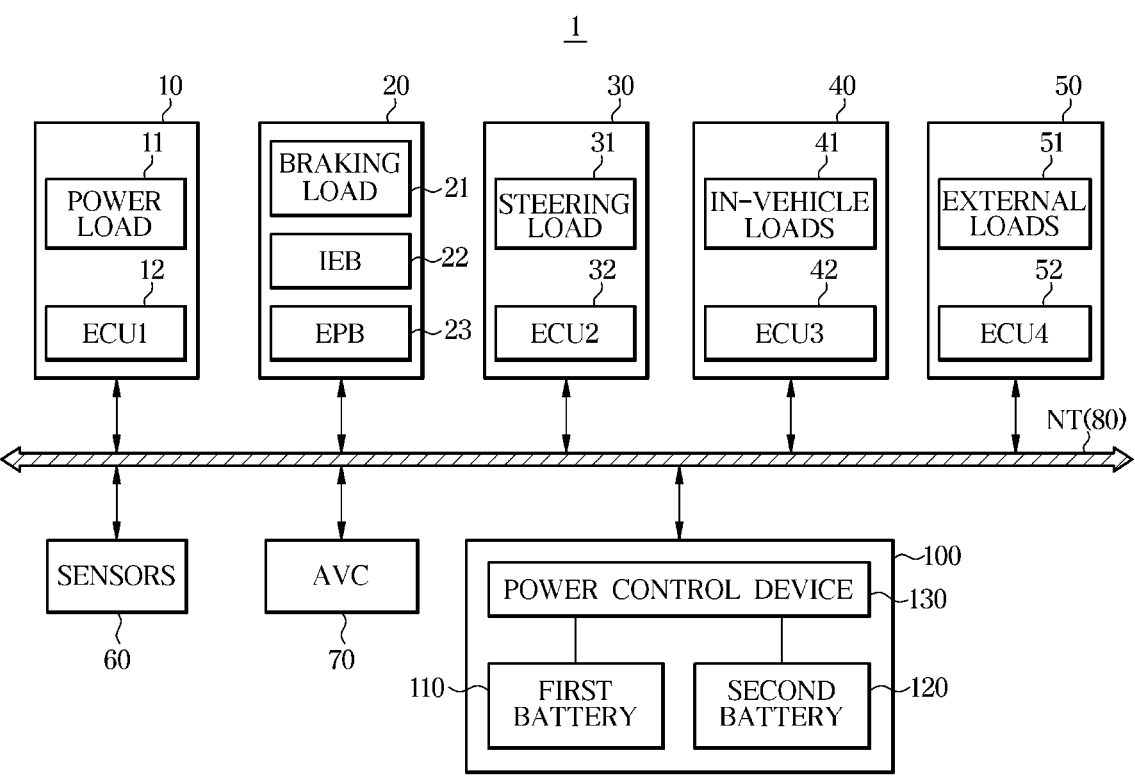
FIG. 1 a block diagram illustrating a configuration of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~module", and the like may refer to at least one process processed by at least one hardware or software. According to embodiments, a plurality of "~parts" or "~modules" may be embodied as a single element, or a single of a "~part" or "~module" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification specifies the presence of stated features, integers, steps, operations, elements, and/or components, but does not preclude the presence or addition of at least one other feature, integer, step, operation, element, component, and/or group thereof.

It will be understood that when it is stated in this specification that a member is located "on" another member, not only may a member be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation but not to limit an order of the steps. Thus, unless the context clearly dictates otherwise, the written order may be practiced otherwise.

Hereinafter, an operation principle and embodiments will be described in detail with reference to the accompanying drawings.

FIG. 1 a block diagram illustrating a configuration of a vehicle according to an embodiment.

A vehicle according to an embodiment may be a vehicle performing a manual driving mode for manually driving in response to a user's driving intention and an autonomous driving mode for autonomously driving to a destination based on current location information and destination information of the vehicle.

The vehicle according to an embodiment may be an internal combustion engine vehicle or a green vehicle.

The green vehicle includes an electric vehicle including a rechargeable battery and a drive motor, the drive motor being rotated with electricity accumulated in the battery, and driving wheels using the rotation of the motor, a hybrid vehicle including an engine, a battery, and a drive motor that is driven by controlling mechanical power of the engine and electrical power of the drive motor, and a hydrogen fuel cell.

An electric vehicle is described as an example in the embodiment.

As shown in FIG. 1, a vehicle 1 includes a power device 10, a brake device 20, a steering device 30, an in-vehicle electronic device 40, an external electronic device 50, a plurality of sensors 60, an autonomous driving control device 70, a communication network 80, and a power supply device 100.

The power device 10 may include a power load 11 for applying a driving force to front, rear, left, and right wheels of the vehicle 1 and a first electronic control unit (ECU1) 12 for controlling operations of the power load 11.

For example, the power load 11 may include a drive motor, an inverter (not shown), a speed reducer (not shown), and the like. Here, the drive motor generates rotational force using electric energy of a first battery 110 and transmits the generated rotational force to the wheels, allowing the wheels to be driven. The inverter converts power of the first battery 110 into driving power of the drive motor and transmits the converted driving power to the drive motor. The speed reducer reduces a speed of the drive motor and transfers a rotational force increasing the torque of the drive motor to the wheels.

The drive motor may be operated as a generator to charge the first battery 110 under energy regeneration conditions due to braking, deceleration, downhill driving, or low speed driving.

The brake device 20 may include a braking load 21 decelerating or stopping the vehicle 1 through friction with the wheels and an electronic brake control module (EBCM) for controlling operations of the braking load 21.

The braking load 21 may include a hydraulic brake device.

The braking load 21 may include a parking brake device generating a braking force by converting kinetic energy into thermal energy using frictional force generated when pressing brake pads onto a disc which rotates integrally with a vehicle wheel.

The EBCM may control the braking load 21 in response to a driver's braking intention through the brake pedal and/or in response to wheel slip. For example, the EBCM may temporarily release the wheel braking in response to the wheel slip detected when braking the vehicle 1 (anti-lock brake system, ABS).

The EBCM may selectively release the wheel braking in response to oversteering and/or understeering detected when steering the vehicle 1 (electronic stability control, ESC).

Also, the EBCM may temporarily brake the wheels in response to the wheel slip detected when driving the vehicle 1 (traction control system, TCS).

The brake device 20 may include an intelligent emergency braking (IEB) 22 generating a braking force in response to a possible collision with an obstacle and an electronic parking brake (EPB) 23 controlling operations of the parking brake.

The EPB 23 may control operations of the parking brake in response to an input of a parking switch (not shown).

The EPB 23 automatically operates the parking brake when the vehicle 1 is stopped or parked and automatically releases the parking brake when an accelerator pedal is pressed when the vehicle starts.

The steering device 30 includes a steering load 31 changing a driving direction of the vehicle 1 and a second ECU (ECU2) 32 controlling operations of the steering load 31.

The steering device 30 may be an electronic power steering (EPS) allowing a driver to easily manipulate a steering wheel in response to a driver's steering intention through the steering wheel.

The EPS may be provided as a hydraulic steering device generating a steering force using hydraulic pressure or an electric steering device generating a steering force using rotational force of a steering motor. In this instance, the electric steering device may be operated by a column assist type generating a steering force by driving a steering motor provided in a column and a rack assist type generating a steering force by driving a steering motor provided in a rack.

The second ECU 32 may control the EPS to reduce a steering force during slow driving or parking and to increase a steering force during high speed driving.

The in-vehicle electronic device 40 may be at least one electronic device provided inside a vehicle body.

The in-vehicle electronic device 40 includes in-vehicle loads 41 for providing state information and driving information of the vehicle, providing convenience to users, and securing a user's safety and a third ECU (ECU3) 42 for controlling operations of the in-vehicle loads 41.

For example, the in-vehicle loads 41 may include a cluster, a terminal for the vehicle, a head unit, a first heating wire for supplying heat to each seat, a second heating wire for supplying heat to a steering wheel, a ventilation device for circulating air in seats, and may also include a seat adjustment device, a window glass opening and closing device, a door opening and closing device, a side mirror angle adjustment device, and the like.

The external electronic device 50 may be at least one electronic device provided on an exterior of the vehicle body.

The external electronic device 50 includes external loads 51 and a fourth ECU (ECU4) 52 for controlling operations of the external loads 51.

For example, the external loads 51 may include a side mirror adjustment device for a side mirror providing a driver with a rear view of the vehicle 1, a lamp for allowing a driver to easily see surrounding information while keeping an eye on a front and functioning as a signal or communication with respect to another vehicle and pedestrians, and a wiper.

In the embodiment, the in-vehicle electronic device 40 and the external electronic device 50 may not be required for autonomous driving control. That is, the in-vehicle electronic device 40 and the external electronic device 50 may be electronic devices except for electronic devices for autonomous driving control.

The third ECU 42 of the in-vehicle electronic device and the fourth ECU 52 of the external electronic device may be provided separately for each load or may be provided as a single ECU to integrally control the in-vehicle loads and the external loads.

The plurality of sensors 60 may detect a road environment, a driving state of the vehicle, and a surrounding environment of the vehicle.

The plurality of sensors 60 may detect information required for autonomous driving control.

For example, the plurality of sensors 60 may include at least one of an acceleration sensor or a wheel speed sensor for detecting a driving speed of the vehicle and may further include a plurality of distance sensors detecting a distance to an obstacle or another vehicle around the vehicle 1, an angular velocity sensor detecting an angular velocity of a steering wheel to detect a steering angle of the vehicle, a yaw rate sensor detecting a yaw moment of the vehicle, an illuminance sensor detecting external illumination, and a door opening and closing sensor.

The plurality of sensors 60 may include at least one image sensor for obtaining images of the road environment and the surrounding environment of the vehicle.

The distance sensors may include at least one of a radar sensor, a light detection and ranging (Lidar) sensor, or an ultrasonic sensor.

When an autonomous driving mode is received through an input device (not shown), the autonomous driving control device 70 searches for a route to a destination from a current location of the vehicle based on current location information received through a position receiver and destination information received through the input device and controls autonomous driving to the destination from the current location based on the retrieved route and map information.

The autonomous driving control device 70 recognizes a road environment, a driving state, and an obstacle based on various information detected by the plurality of sensors during autonomous driving control and autonomously controls vehicle driving according to the retrieved route while avoiding obstacles based on the recognized road environment, the obstacle information, and the driving state of the vehicle.

The autonomous driving control device 70 may recognize other vehicles, pedestrians, cyclists, lanes, traffic signs, and the like based on image information obtained by the at least one image sensors.

The autonomous driving control device 70 may obtain relative positions, relative speeds, and the like of the obstacles (e.g., other vehicles, pedestrians, cyclists, etc.) based on distance information detected by the plurality of distance sensors.

When road image information is received during autonomous driving control, the autonomous driving control device 70 may recognize lanes of a road through image processing, may recognize a vehicle's own lane where the vehicle is travelling and surrounding lanes based on location information of the recognized lanes, may generate a lane to travel based on lane information of the recognized own lane and route information, and may control autonomous driving based on location information of the generated lane to travel and obstacle information.

The autonomous driving control device 70 may control a speed of the vehicle so that an actual driving speed becomes a desired driving speed based on desired driving speed information and driving speed information detected by a speed sensor during autonomous driving control. Here, the desired driving speed information may be preset driving speed information or desired driving speed information input by a user.

The autonomous driving control device 70 may control a display (not shown) to display, as an image, navigation information in which map information, departure point information, route information, and road guidance information are matched during autonomous driving control.

The autonomous driving control device 70 may periodically identify current location information of the vehicle during autonomous driving control and may control the display to display, as an image, navigation information that matches with the identified current location information of the vehicle.

The autonomous driving control device 70 may also control a speaker (not shown) to output navigation information as sound during autonomous driving control.

When it is determined that a disconnection, short circuit, or error occurs in at least one communication line of a plurality of communication lines connected to the power supply device 100, the autonomous driving control device 70 may hand over control of the vehicle to a user.

When it is determined that a hardware failure occurs in a communication module of at least one device provided in the power supply device 100, the autonomous driving control device 70 may hand over control of the vehicle to a user.

The autonomous driving control device 70 may display failure information about a communication failure point and a communication failure type and may control the display to display failure response information.

The communication failure may include a disconnection, short circuit, or error of at least one communication line of the plurality of communication lines connected to the power supply device 100 and a hardware failure of a communication module of the at least one device provided in the power supply device 100.

The autonomous driving control device 70 may control the display to output guide information to guide driving in a manual driving mode when vehicle control is handed over.

The power supply device 100 may supply power to the power device 10, the brake device 20, the steering device 30, the plurality of sensors 60, and the autonomous driving control device 70 and may also supply power to the in-vehicle electronic device 40 and the external electronic device 50.

The power supply device 100 may include the first battery 110, a second battery 120, and a power control device 130 controlling power supplied through the first battery 110 and the second battery 120.

The first battery 110 may be a battery capable of being charged or discharged.

The first battery 110 may be charged by receiving external power and may be charged using power generated during regenerative braking.

The first battery 110 may be a main power source of a high-power load L1 provided in the vehicle.

The first battery 110 supplies power to a power train including a drive motor of the power device 10 and the high-power load L1 consuming high voltage power.

The high-power load L1 may include a compressor of an air conditioner or a heater for air conditioning.

The high-power load L1 may be a load to which a voltage higher than a preset voltage is applied.

The first battery 110 may also supply power to the second battery 120.

The second battery 120 may be a battery capable of being charged or discharged.

The second battery 120 may be charged by using the power charged in the first battery 110.

The second battery 120 may supply power to a low-power load L2 when the vehicle is stopped. That is, the second battery 120 may be an auxiliary power source for the low-power load L2 provided in the vehicle.

The second battery 120 may supply power to the low-power load L2 in an event of failure in the power converter in response to a control command of the autonomous driving control device 70.

The low-power load L2 may be a load to which a voltage less than a preset voltage is applied.

The low-power load L2 may be a load that operates by consuming a voltage lower than a voltage consumed by the high-power load L1.

For example, the low-power load L2 may include electronic components such as the brake device 20, the steering device 30, the in-vehicle electronic device 40, the external electronic device 50, the plurality of sensors 60, and the autonomous driving control device 70.

The power control device 130 may be a device managing low-voltage power.

The power control device 130 may also manage high-voltage power.

The power control device 130 may monitor an entire power state of the vehicle, control power distribution, may recognize a failure in a communication line of the vehicle, and may transmit information about the recognized communication line failure to the autonomous driving control device 70. A detailed configuration of the power control device 130 is described later.

The above-described constituent components of the vehicle may communicate with each other through a vehicle communication network (NT) 80. For example, the electronic components of the vehicle may transmit and receive data and signals through Ethernet, media oriented systems transport (MOST), a FlexRay, a controller area network (CAN), a local interconnect network (LIN), and the like.

More specifically, the communication network may perform communication among the various electronic devices in the vehicle.

The communication network 80 may include at least one constituent component enabling communication between an external device and the constituent components of the vehicle, for example, at least one of a short-range communication module, a wireless communication module, or a wired communication module.

The short-range communication module may include a variety of short-range communication modules that transmit and receive signals in a short distance using a wireless communication network, such as a Bluetooth module, an infrared communication module, a radio frequency identification (RFID) communication module, a wireless local access network (WLAN) communication module, a near-field communication (NFC) communication module, a Zigbee communication module, and the like.

The wired communication module may include various wired communication modules such as a controller area network (CAN) communication module, a local area network (LAN) module, a wide area network (WAN) module, a value added network (VAN) module, or the like, and also may include various cable communication modules such as a universal serial bus (USB), a high definition multimedia interface (HDMI), a digital visual interface (DVI), a recommended standard 232 (RS-232), a power line communication, a plain old telephone service (POTS), or the like.

The CAN communication module may transmit a control signal to at least one of an electronic device, a detection device, or at least one controller through two communication lines including a high line and a low line and may transmit thousands of signals per second when the signal is transmitted.

The CAN communication module may be classified into a low-speed CAN communication module and a high-speed CAN communication module based on a communication speed for transmitting and receiving control signals.

Here, the low-speed CAN communication module may be a CAN communication module having a communication speed less than a reference speed, and the high-speed CAN communication module may be a CAN communication module having a communication speed greater than or equal to the reference speed.

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), ultra wideband (UWB), and the like, in addition to a Wifi module and a Wibro module.

The vehicle 1 may further include a position receiver for obtaining current location information of the vehicle.

The position receiver may include a global positioning system (GPS) receiver. Here, the GPS receiver includes an antenna module for receiving signals from a plurality of satellites and a signal processor. The signal processor includes a software for obtaining a current location using distance and time information corresponding to position signals of the plurality of GPS satellites and a transmitter for transmitting obtained location information of the vehicle.

Figure 2:
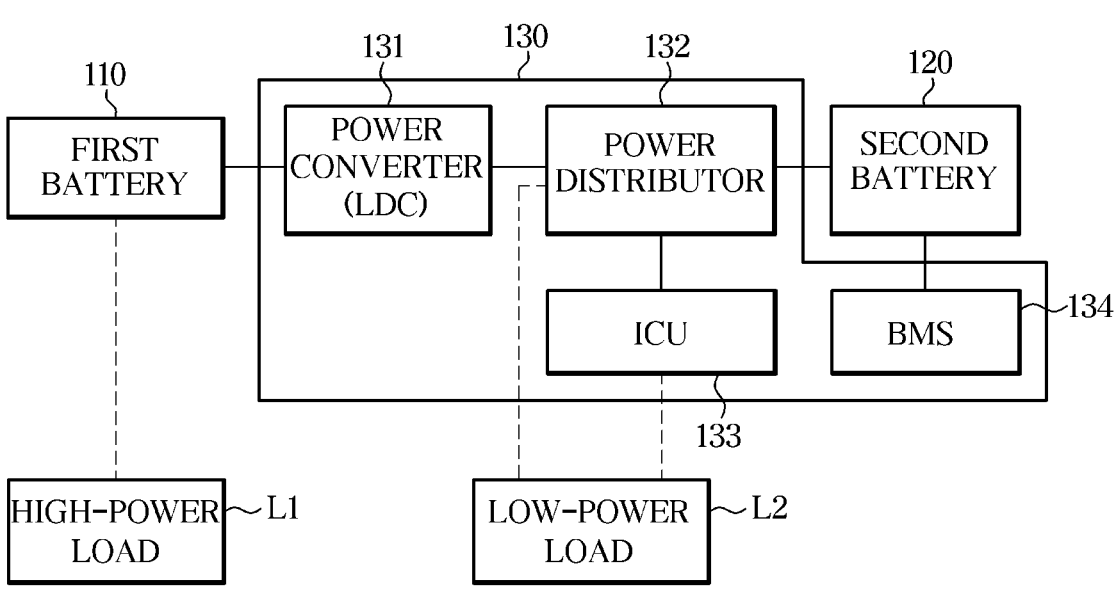
FIG. 2 is a block diagram illustrating a configuration of a power supply device provided in a vehicle according to an embodiment.

FIG. 2 is a block diagram illustrating a configuration of a power supply device of a vehicle according to an embodiment.

The power control device 130 includes a power converter 131, a power distributor 132, an integrated central control unit (ICU) 133, and a battery management system (BMS) 134. Here, the power converter 131 converts high-voltage direct current (DC) power of the first battery 110 into low-voltage DC power, and the power distributor 132 distributes the low-voltage power converted by the power converter 131 and supplies to the low-power loads L2. The ICU 133 controls communication among constituent components of the power control device 130, and the BMS 134 controls and manages charging and discharging of the second battery 120.

The first battery 110, the power converter 131, the power distributor 132, the ICU 133, the BMS 134, and the second battery 120 are connected to each other through power supply lines.

The power converter 131, the power distributor 132, and the BMS 134 are connected to the ICU 133 through communication lines.

The power converter 131 is supplied with power from the first battery 110 and converts a voltage of power supplied from the first battery 110 into a voltage lower than the voltage of the first battery 110.

The power converter 131 may be a lower DC-DC converter (LDC) converting high-voltage DC power into low-voltage DC power.

The power converter 131 may include at least one switch element and inductor.

The power converter 131 may supply the converted low-voltage power to the power distributor 132. Through the above, the low-voltage power converted from the power converter 131 may be supplied to the low-power load L2.

The low-voltage power supplied through the power converter 131 may be used as a main power source for the low-power load L2 when the vehicle is travelling.

The power converter 131 may convert a DC power of the first battery 110 into a DC power required for charging the second battery 120 and may supply the converted DC power to the second battery 120 to charge the second battery 120.

The power converter 131 may supply power to the second battery 120 when the vehicle may drive.

The power distributor 132 is connected to the power converter 131 and distributes the low-voltage power supplied from the power converter 131 to supply to the low-power loads L2.

The power distributor 132 may be a junction block.

The power distributor 132 supplies low-voltage power to the low-power loads L2 except for the in-vehicle electronic device 40. For example, the power distributor 132 supplies the low-voltage power to the external electronic device 50, the brake device 20, the steering device 30, the sensors 60, and the autonomous driving control device 70.

The power distributor 132 may doubly supply the low-voltage power to the brake device 20, the steering device 30, the sensors 60, and the autonomous driving control device 70.

The ICU 133 is connected to the power distributor 132 and may be supplied with the low-voltage power from the power distributor 132 and may distribute the low-voltage power supplied from the power distributor 132 to the in-vehicle electronic device 40 among the low-power loads L2.

The ICU 133 may be supplied with the low-voltage power, converted from the power converter 131, through the power distributor 132. In this case, the low-voltage power converted from the power converter 131 may be a main power source for the low-power loads L2.

The ICU 133 may be supplied with power from the second battery 120 through the power distributor 132. In this case, the power supplied from the second battery 120 may be an auxiliary power source for the low-power loads L2.

The ICU 133 may be a communication gateway performing routing when transmitting and receiving information among a plurality of devices.

The ICU 133 may perform communication with the power converter 131, the power distributor 132, and the BMS 134, and also may perform communication with the brake device 20, the steering device 30, the external electronic device 50, the sensors 60, and the autonomous driving control device 70. Accordingly, the ICU 133 may enable communication among the constituent components of the power control device 130 and among the constituent components of the vehicle.

The BMS 134 may monitor a state of charge (SoC) and a discharging state of the second battery 120 and may transmit information about the monitored SoC and discharging state of the second battery 120 to the power distributor 132. That is, the BMS 134 may monitor input/output current, voltage, and current of the second battery 120.

The BMS 134 may include a plurality of sensors (not shown) collecting information about a state of the second battery 120 such as an output voltage, an input/output current, a temperature, and the like, of the second battery 120.

The plurality of sensors provided in the BMS 134 may include a current sensor detecting a current of the second battery 120, a voltage sensor detecting a voltage of an output terminal of the second battery 120, and a temperature sensor detecting a temperature of the second battery 120.

The BMS 134 may obtain a SoC of the second battery 120 corresponding to a current, a voltage, and a temperature of the second battery from a prestored table. In the prestored table, a charge amount of the second battery 120 may be matched to correspond to a correlation of each of the current, the voltage, and the temperature of the second battery 120.

The BMS 134 may calculate and manage the SoC of the second battery 120 and a state of health (SoH) of the second battery 120 based on the information about the state of the second battery 120.

The BMS 134 may include an intelligent battery switch (not shown) for controlling charging and discharging of the second battery 120.

The BMS 134 may control turning on and off of the switch based on the SoC of the second battery 120.

By controlling to turn on the switch to charge the second battery 120, the BMS 134 may allow the second battery 120 to be charged using power of the first battery 110 and may identify the SoC of the second battery 120 while the second battery 120 is being charged. When the amount of charge corresponding to the identified SoC is the preset allowable charge amount, the BMS 134 may control the switch to be turned off to stop charging.

The BMS 134 may be implemented as a memory (not shown) that stores an algorithm for controlling charging/discharging of the second battery 120 or data about a program that reproduces the algorithm and a processor (not shown) that performs the above-described operations using the data stored in the memory. In this instance, the memory and the processor may be provided as one chip or provided as separate chips.

Figure 3:
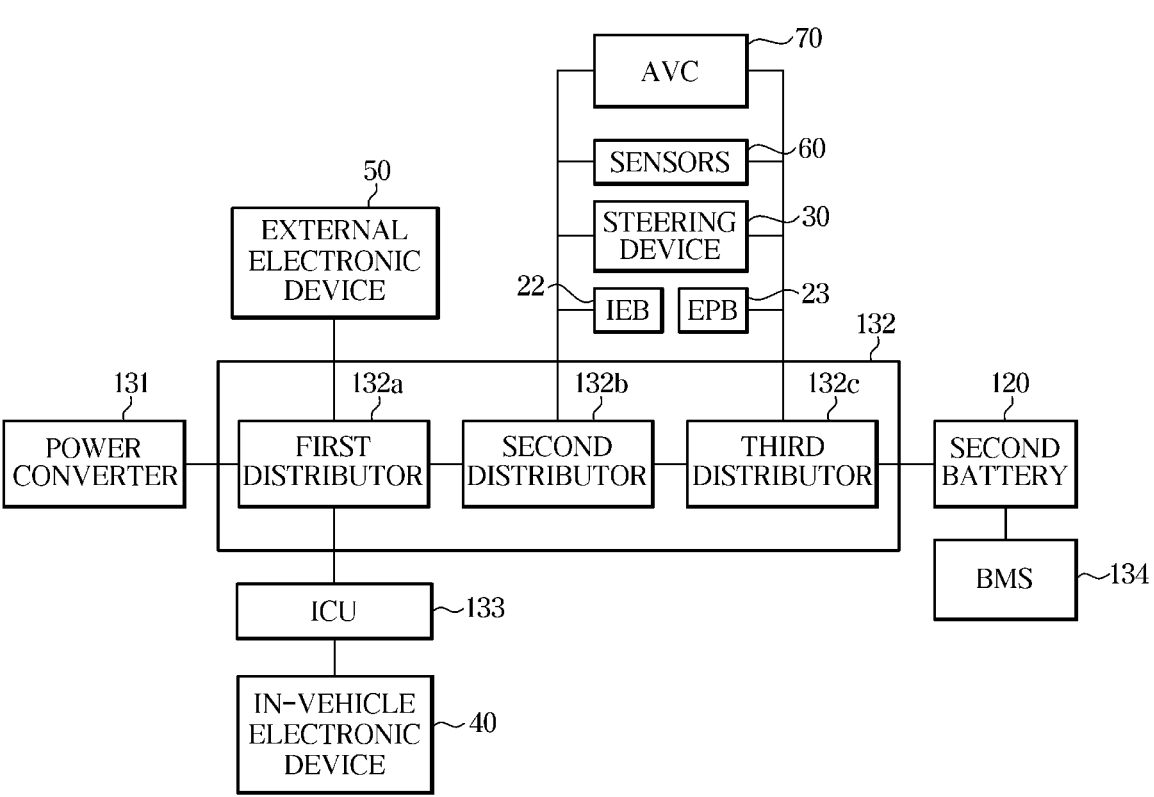
FIG. 3 is a detailed block diagram illustrating a configuration of a power control device of the power supply device of FIG. 2.

FIG. 3 is a detailed block diagram illustrating a configuration of a power control device of the power supply device of FIG. 2.

The power distributor 132 provided in the power control device 130 may include a first distributor 132*a*, a second distributor 132*b*, and a third distributor 132*c*.

When the vehicle is traveling, the power converter 131 converts power supplied from the first battery 110 into a low-voltage DC power and supplies the converted low-voltage DC power to the first distributor 132*a*.

The first distributor 132*a* may be connected to the power converter 131 and may be connected to the ICU 133 and the external electronic device 50.

The first distributor 132*a* may be connected to the second distributor 132*b*.

The first distributor 132*a* may supply the low-voltage power supplied from the power converter 131 to the ICU 133 and the external electronic device 50 and also may supply to the second distributor 132*b*.

The first distributor 132*a* may be a junction block for power distribution that distributes low-voltage power supplied from the power converter 131 and supplies to other devices.

The ICU 133 may be connected to the first distributor 132*a* and the in-vehicle electronic device 40 and may supply the low-voltage power supplied from the first distributor 132*a* to the in-vehicle electronic device 40.

The ICU 133 may be supplied with the low-voltage power converted by the power converter 131 through the first distributor 132*a*. In this case, the low-voltage power converted by the power converter 131 may be a main power source for the low-power loads.

The ICU 133 may be connected to the third distributor 132*c* and may be supplied with power from the second battery 120 through the third distributor 132*c*. In this case, the power supplied from the second battery 120 may be an auxiliary power source for the low-power loads.

The second distributor 132*b* may be connected to the first distributor 132*a* and may be supplied with the low-voltage power from the first distributor 132*a*.

The second distributor 132*b* may be connected to the brake device 20, the steering device 30, the sensors 60, and the autonomous driving control device 70 and may supply power to the brake device 20, the steering device 30, the sensors 60, and the autonomous driving control device 70.

The second distributor 132*b* may supply power to the IEB 22 of the brake device 20.

The third distributor 132*c* may be connected to the second distributor 132*b* and may be supplied with power from the second distributor 132*b*.

The third distributor 132*c* may be connected to the brake device 20, the steering device 30, the sensors 60, and the autonomous driving control device 70 and may supply power to the brake device 20, the steering device 30, the sensors 60, and the autonomous driving control device 70.

The third distributor 132*c* may supply power to the EPB 23 of the brake device 20.

The third distributor 132*c* may be connected to the second battery 120 and may supply the low-voltage power converted by the power converter 131 to the second battery 120, thereby allowing the second battery 120 to be charged.

The third distributor 132*c* may supply the power of the second battery 120 to the ICU 133.

The third distributor 132*c* may supply the power of the second battery 120 to the first distributor 132*a*, the in-vehicle electronic device 40, the second distributor 132*b*, and the external electronic device 50. The third distributor 132*c* may also supply the power of the second battery 120 to the brake device 20, the steering device 30, the sensors 60, and the autonomous driving control device 70.

The second distributor 132*b* and the third distributor 132*c* may be a junction block that distributes low-voltage power for supplying to loads for autonomous driving.

The second distributor 132*b* and the third distributor 132*c* may simultaneously supply power to the steering device 30, the sensors 60, and the autonomous driving control device 70.

Through the above, even when a disconnection occurs in at least one power supply line of a plurality of power supply lines, the power of the second battery 120 may be supplied to the steering device 30, the sensors 60, and the autonomous driving control device 70 through the third distributor 132*c*.

The EPB 23 of the brake device may be supplied with the power of the second battery 120 through the third distributor 132*c*.

The IEB 22 of the brake device may be supplied with the power of the power converter 131 through the second distributor 132*b*.

Through the above, even when a disconnection occurs in at least one power supply line of the plurality of power supply lines, the vehicle may perform emergency braking control and parking braking control.

Figure 4:
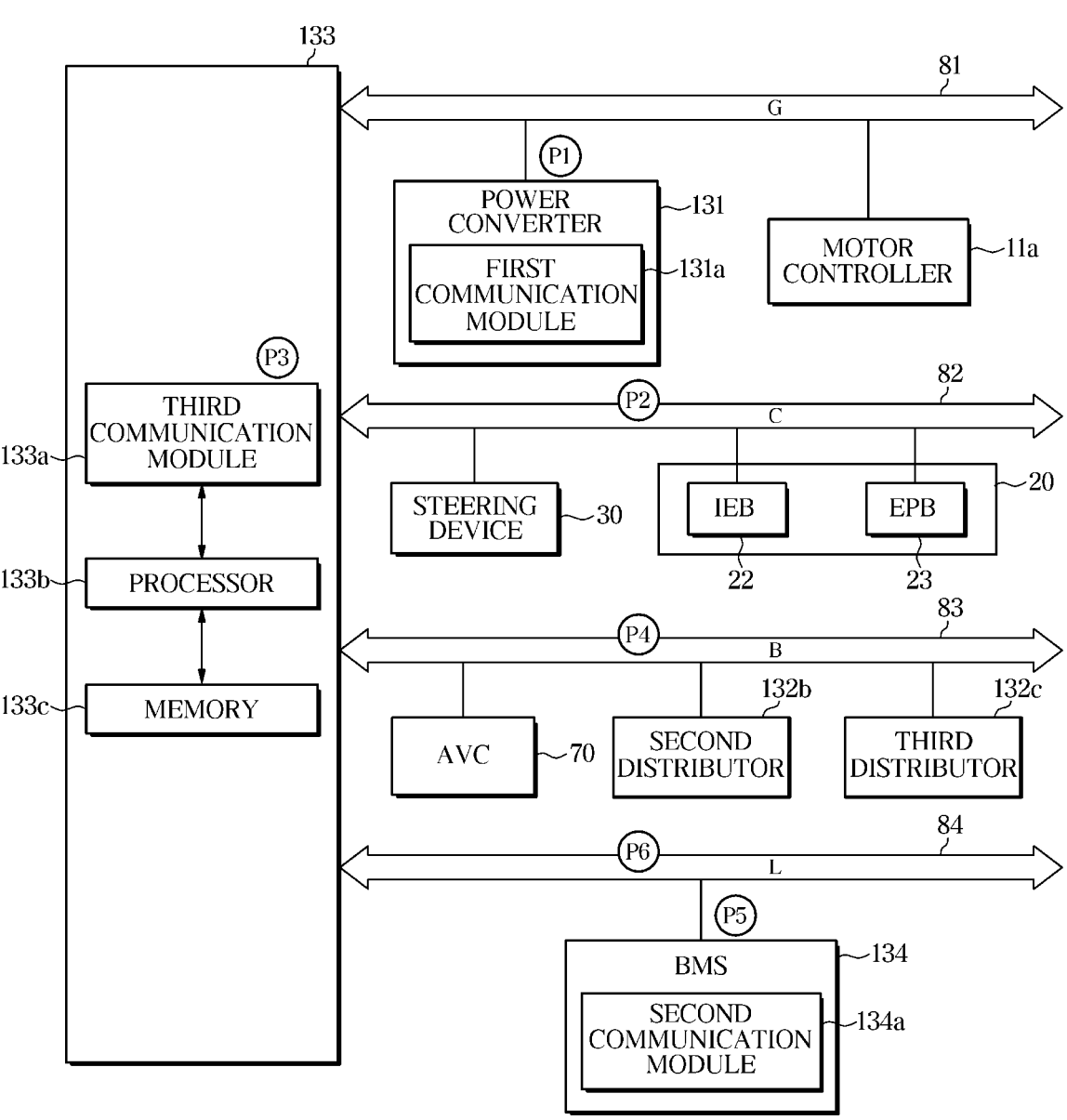
FIG. 4 illustrates a configuration of a communication network of a vehicle according to an embodiment.

FIG. 4 illustrates a configuration of a communication network of a vehicle according to an embodiment, which is described with reference to FIG. 5.

FIG. 5 illustrates an example of a failure type, a determination device, and failure notification information by failure point.

The vehicle 1 may include a first communication network 81 transmitting and receiving a signal related to supply of a high-voltage power, a second communication network 82 transmitting and receiving a signal related to steering control and braking control, a third communication network 83 transmitting and receiving a signal related to charging and discharging of the second battery 120, and a fourth communication network 84 transmitting and receiving a signal related to autonomous driving control and power supply.

The first, second, third, and fourth communication networks 81, 82, 83, and 84 may be a network for CAN communication.

The first communication network 81, the second communication network 82, the third communication network 83, and the fourth communication network may be a G network, a C network, a B network, and a L network, respectively.

The first communication network 81 may be connected to the power converter 131 and a motor controller 11a.

The first communication network 81 may transmit and receive a signal, information, and data between the power converter 131 and the ICU 133 and also may transmit and receive a signal, information, and data between the ICU 133 and the motor controller 11a.

The second communication network 82 may be connected to the steering device 30 and the brake device 20.

The second communication network 82 may transmit and receive a signal, information, and data between the steering device 30 and the ICU 133 and also may transmit and receive a signal, information, and data between the brake device 20 and the ICU 133.

Here, the brake device 20 may include the IEB 22 and the EPB 23.

The third communication network 83 may be connected to the autonomous driving control device 70, the second distributor 132b, and the third distributor 132c.

The third communication network 83 may transmit and receive a signal, information, and data between the autonomous driving control device 70 and the ICU 133, may transmit and receive a signal, information, and data between the second distributor 132b and the ICU 133, and may transmit and receive a signal, information, and data between the third distributor 132c and the ICU 133.

The third communication network 83 may transmit and receive a signal, information, and data among the autonomous driving control device 70, the second distributor 132b, and the third distributor 132c.

The fourth communication network 84 may be connected to the BMS 134.

The fourth communication network 84 may transmit and receive a signal, information, and data between the BMS 134 and the ICU 133.

The power converter 131 is connected to the first communication network 81 and includes a first communication module 131a for communicating with other devices.

The power converter 131 is connected to the ICU 133 through a communication line of the first communication network 81 and may communicate with the ICU 133.

The power converter 131 may monitor at least one of power, current, or voltage, transmit the monitored information to the ICU 133 through the first communication network 81, and receive a control signal for power conversion from the ICU 133 through the first communication network 81.

The power converter 131 may periodically transmit a message for determining a communication failure to the ICU 133 through the first communication module 131a.

Here, the communication failure may include a hardware failure in the first communication module 131a and a disconnection of the communication line of the first communication network 81 connected to the first communication module 131a.

The BMS 134 is connected to the fourth communication network 84 and includes a second communication module 134a for communicating with other devices.

The BMS 134 is connected to the ICU 133 through a communication line of the fourth communication network 84 and may communicate with the ICU 133.

The BMS 134 may monitor at least one of a SoC, power, current, or voltage of the second battery 120, transmit the monitored information to the ICU 133 through the fourth communication network 84, and receive a control signal for charging and discharging of the second battery 120 from the ICU 133 through the fourth communication network 84.

The BMS 134 may periodically transmit a message for determining a communication failure to the ICU 133 through the second communication module 134a.

Here, the communication failure may include a hardware failure in the second communication module 134a and a disconnection of the communication line of the fourth communication network 84 connected to the second communication module 134a.

The brake device 20 may receive a braking control signal transmitted from the ICU 133 through a communication line of the second communication network 82.

The brake device 20 may transmit operation information of the brake device to the ICU 133 through the communication line of the second communication network 82.

The steering device 30 may receive a steering control signal transmitted from the ICU 133 through the communication line of the second communication network 82.

The steering device 30 may transmit operation information of the steering device to the ICU 133 through the communication line of the second communication network 82.

The autonomous driving control device 70 may communicate with the second distributor 132b and the third distributor 132c through the third communication network 83.

The autonomous driving control device 70 may communicate with the ICU 133 through the third communication network 83.

The autonomous driving control device 70 may transmit and receive a signal, information, and data with at least one of the brake device 20, the steering device 30, the BMS 134, or the power converter 131 through the ICU 133.

The autonomous driving control device 70 may monitor a communication state of the third communication network 83 and may determine whether an error or short-circuit occurs in the communication line of the third communication network 83 based on the monitored communication state.

The autonomous driving control device 70 may receive failure information about hardware failure in at least one communication module and failure information of at least one communication line of the plurality of communication lines from at least one of the second distributor 132b or the third distributor 132c.

For example, the failure information may include hardware failure information of the first communication module 131a of the power converter 131, hardware failure information of the second communication module 134a of the BMS 134, hardware failure information of a third communication module 133a of the ICU 133, disconnection information of the communication line of the first communication network 81, disconnection information of the communication line of the third communication network 83, disconnection information of the communication lines of the second communication network 82 and the fourth communication network 84, error information, and short-circuit information.

The autonomous driving control device 70 may control a display to display the received failure information and also may control the display to display failure response information in response to the failure information.

For example, the display may display failure information about transmission failure of the power converter 131, communication line failure of the second, third, and fourth communication networks, transmission failure of the ICU and the third communication network, transmission failure of the BMS, and the like.

The autonomous driving control device 70 may hand over control of the vehicle to a user based on the received failure information. That is, the autonomous driving control device 70 may switch an autonomous driving mode to a manual driving mode.

When it is determined that a hardware failure occurs in the first communication module of the power converter or a disconnection occurs in the communication line of the first communication network connected to the first communication module, the autonomous driving control device 70 may control the BMS to supply power of the second battery to the low-power load.

The second distributor 132b may communicate with the ICU 133 through the third communication network 83 and may transmit and receive a signal, information, and data with at least one of the power converter 131 or the BMS 134 through the ICU 133.

The second distributor 132b may monitor a communication state of the third communication module of the ICU 133 and may determine a hardware failure in the third communication module and a disconnection in the communication line of the third communication network 83 based on the monitored communication state.

When it is determined that the hardware failure occurs in the third communication module of the ICU 133 and the disconnection occurs in the communication line of the third communication network 83, the second distributor 132b may transmit, to the autonomous driving control device 70, information about the hardware failure in the third communication module of the ICU 133 and the disconnection in the communication line of the third communication network 83.

When information about a hardware failure in the first communication module 131a and a disconnection in the communication line of the first communication network 81 is received from the ICU 133, the second distributor 132b may transmit, to the autonomous driving control device 70, the received information about the hardware failure in the first communication module 131a and the disconnection in the communication line of the first communication network 81.

When information about a hardware failure in the second communication module 134a and a disconnection in the communication line of the fourth communication network 84 is received from the ICU 133, the second distributor 132b may transmit, to the autonomous driving control device 70, the received information about the hardware failure in the second communication module 134a and the disconnection in the communication line of the fourth communication network 84.

When error information and short-circuit information of the communication line of the second communication network 82 is received from the ICU 133, the second distributor 132b may transmit, to the autonomous driving control device 70, the received error information and short-circuit information of the communication line of the second communication network 82.

When error information and short-circuit information of the communication line of the fourth communication network 84 is received from the ICU 133, the second distributor 132b, may transmit, to the autonomous driving control device 70, the received error information and short-circuit information of the communication line of the fourth communication network 84.

That is, the second distributor 132b may communicate with the autonomous driving control device 70 through the third communication network 83 and may transmit information about communication failure to the autonomous driving control device 70.

The second distributor 132b may be implemented as a memory (not shown) that stores an algorithm for monitoring a communication state of the ICU, distributing power, and transmitting and receiving received failure information about communication failure, or data about a program that reproduces the algorithm, and a processor (not shown) that performs the above-described operations using the data stored in the memory. In this instance, the memory and the processor may be provided as one chip or provided as separate chips.

The third distributor 132c may communicate with the ICU 133 through the third communication network 83 and may transmit and receive a signal, information, and data with at least one of the power converter 131 or the BMS 134 through the ICU 133.

The third distributor 132c may monitor a communication state of the third communication module 133a of the ICU 133 and may determine a hardware failure in the third communication module 133a and a disconnection in the communication line of the third communication network 83 based on the monitored communication state.

When it is determined that the hardware failure occurs in the third communication module 133a of the ICU 133 and a disconnection occurs in the communication line of the third communication network 83, the third distributor 132c may transmit, to the autonomous driving control device 70, information about the hardware failure in the third communication module of the ICU 133 and the disconnection in the communication line of the third communication network 83.

When information about a hardware failure in the first communication module 131a and a disconnection in the communication line of the first communication network 81 is received from the ICU 133, the third distributor 132c may transmit, to the autonomous driving control device 70, the received information about the hardware failure in the first communication module 131a and the disconnection in the communication line of the first communication network 81.

When information about a hardware failure in the second communication module 134a and a disconnection in the communication line of the fourth communication network 84 is received from the ICU 133, the third distributor 132c may transmit, to the autonomous driving control device 70, the received information about the hardware failure in the second communication module 134a and the disconnection in the communication line of the fourth communication network 84.

When error information and short-circuit information of the communication line of the second communication network 82 is received from the ICU 133, the third distributor 132c may transmit, to the autonomous driving control device 70, the received error information and short-circuit information of the communication line of the second communication network 82.

When error information and short-circuit information of the communication line of the fourth communication network 84 is received from the ICU 133, the third distributor 132c may transmit, to the autonomous driving control device 70, the received error information and short-circuit information of the communication line of the fourth communication network 84.

That is, the third distributor 132c may communicate with the autonomous driving control device 70 through the third communication network 83 and may transmit information about communication failure to the autonomous driving control device 70.

The third distributor 132c may be implemented as a memory (not shown) that stores an algorithm for monitoring a communication state of the ICU, distributing power to low-power loads, and transmitting and receiving received failure information about communication failure, or data about a program that reproduces the algorithm, and a processor (not shown) that performs the above-described operations using the data stored in the memory. In this instance, the memory and the processor may be provided as one chip or provided as separate chips.

The hardware failure in the third communication module of the ICU and the disconnection in the communication line of the third communication network may be determined by using at least one of the second distributor or the third distributor.

Transmitting the failure information about communication failure, transmitted from the ICU, to the autonomous driving control device may also be performed by using at least one of the second distributor or the third distributor.

The ICU 133 may be connected to the first, second, third, and fourth communication networks 81, 82, 83, and 84, and may communicate with the power converter 131, the motor controller 11a, the steering device 30, the brake device 20, the autonomous driving control device 70, the second distributor 132b, the third distributor 132c, and the BMS 134.

The ICU 133 may monitor a communication state of the first communication module 131a of the power converter 131 and may determine a hardware failure in the first communication module 131a of the power converter 131 and a disconnection in the communication line of the first communication network 81 based on the monitored communication state.

Here, the disconnection in the communication line of the first communication network 81 may be a disconnection in a communication line connected to the first communication module 131a.

The ICU 133 may monitor a communication state of the second communication module 134a of the BMS 134 and may determine a hardware failure in the second communication module 134a of the BMS 134 and a disconnection in the communication line of the fourth communication network 84 based on the monitored communication state.

Here, the disconnection in the communication line of the fourth communication network 84 may be a disconnection in a communication line connected to the second communication module 134a.

The ICU 133 may be implemented as a memory 133c that stores an algorithm for monitoring communication states of various devices, distributing power to low-power loads, and transmitting and receiving received failure information about communication failure, or data about a program that reproduces the algorithm, and a processor 133b that performs the above-described operations using the data stored in the memory. In this instance, the memory 133c and the processor 133b may be provided as one chip or provided as separate chips.

The processor 133b of the ICU 133 may monitor the second communication network 82 and may determine an error or short-circuit in a communication line of the second communication network 82 based on the monitored information.

The processor 133b of the ICU 133 may monitor the fourth communication network 84 and may determine an error or short-circuit in a communication line of the fourth communication network 84 based on the monitored information.

The error in the communication lines of the second communication network 82 and the fourth communication network 84 may occur when noise flows into the communication line.

When it is determined that the error occurs in the communication lines of the second communication network 82 and the fourth communication network 84 the preset number of times, the processor 133b of the ICU 133 may determine that an error or short-circuit occurs in the communication lines of the second communication network 82 and the fourth communication network 84.

When it is determined that the hardware failure occurs in the first communication module 131a of the power converter and a disconnection occurs in the communication line, the processor 133b of the ICU 133 may allow information about the hardware failure in the first communication module 131a of the power converter and the disconnection in the communication line to be transmitted to at least one of the second distributor 132b or the third distributor 132c.

When it is determined that the hardware failure occurs in the second communication module 134a of the BMS and a disconnection occurs in the communication line, the processor 133b of the ICU 133 may allow information about the hardware failure in the second communication module 134a of the BMS and the disconnection in the communication line to be transmitted to at least one of the second distributor 132b or the third distributor 132c.

When a message is not received from at least one of the power converter 131 or the BMS 134 within a set period of time, the processor 133b of the ICU 133 may determine a 'time-out' and determine that a failure occurs in the first communication module or the second communication module.

When it is determined that an error and short-circuit occurs in the communication line of the second communication network 82, the processor 133b of the ICU 133 may allow information about the error and short-circuit in the communication line of the second communication network 82 to be transmitted to at least one of the second distributor 132b or the third distributor 132c.

When it is determined that an error and short-circuit occurs in the communication line of the fourth communication network 84, the processor 133b of the ICU 133 may allow information about the error and short-circuit in the communication line of the fourth communication network 84 to be transmitted to at least one of the second distributor 132*b* or the third distributor 132*c*.

The memory 133*c* may store IP addresses and identification information of the power converter 131, the motor controller 11*a*, the steering device 30, the brake device 20, the autonomous driving control device 70, the second distributor 132*b*, the third distributor 132*c*, and the BMS 134.

The memory 133*c* may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD) or a compact disc read only memory (CD-ROM), without being limited thereto.

The power control device may determine a communication failure point and a communication failure type and may transmit failure information about communication failure to the autonomous driving control device 70.

Briefly described with reference to FIG. 5, the ICU 133 may determine a failure P1 in the first communication module of the power converter, a failure P2 in the communication line of the second communication network, a failure P5 in the second communication module of the BMS, and a failure P6 in the communication line of the fourth communication network.

The ICU 133 may transmit, to the autonomous driving control device 70, failure information determined through the second distributor or the third distributor.

The second distributor or the third distributor may determine a failure P3 in the third communication module of the ICU 133.

The second distributor or the third distributor may transmit failure information about the third communication module of the ICU 133 to the autonomous driving control device 70.

The autonomous driving control device 70 may determine a failure P4 in the communication line of the third communication network.

The autonomous driving control device 70 may display failure information about the communication failure as notification information.

At least one constituent component may be added or omitted corresponding to the performance of the constituent components of the vehicle and the power control device illustrated in FIGS. 1, 2, 3, and 4. Also, it will be easily understood by those skilled in the art that mutual positions of the constituent components may be modified corresponding to the performance or structure of the vehicle.

Meanwhile, each of the constituent components shown in FIGS. 1, 2, 3, and 4 refers to a software and/or a hardware component such as a field-programmable gate array (FPGA) or an application-specific integrated circuit (ASIC).

Figure 6:
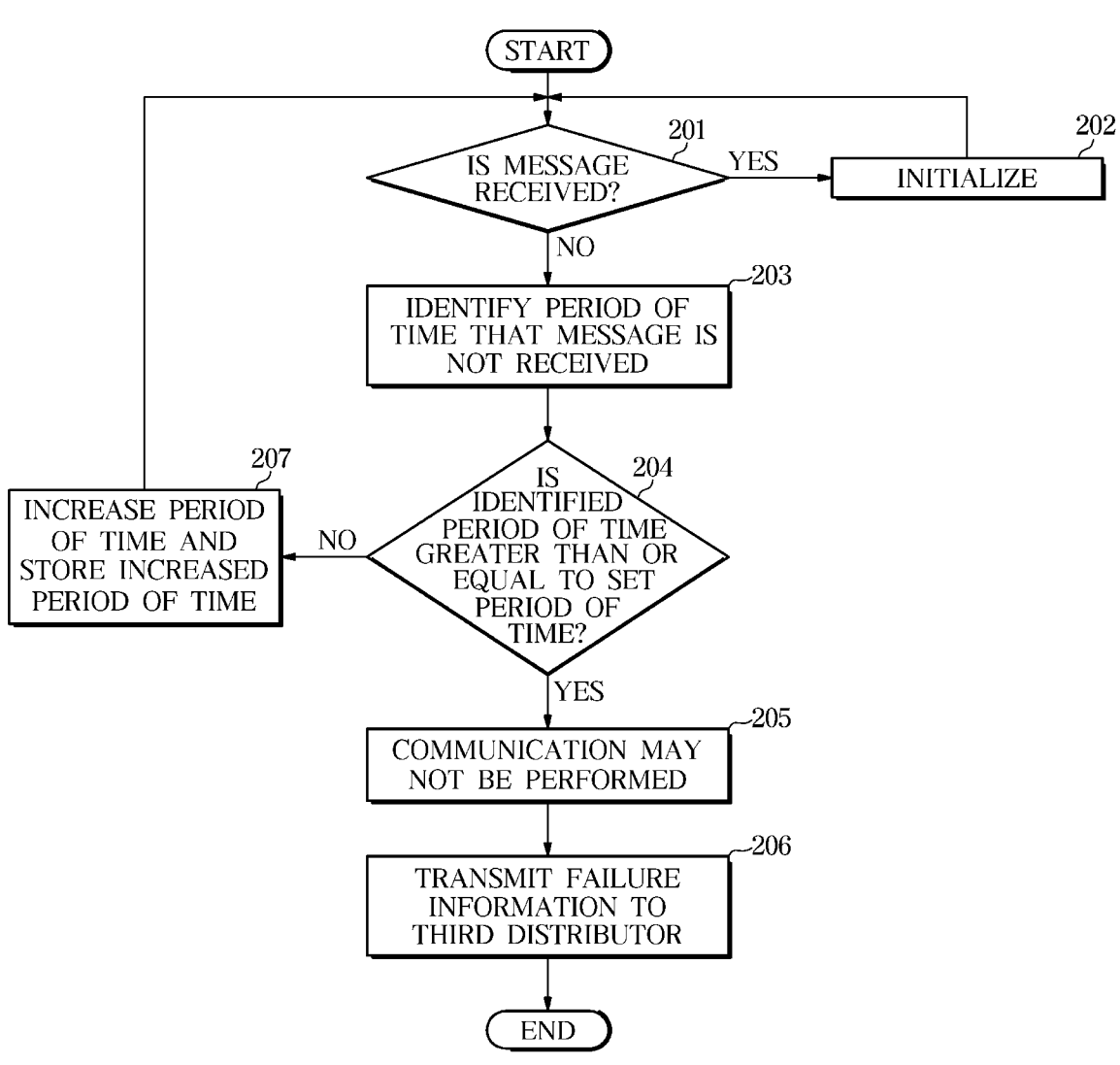
FIG. 6 is a flowchart illustrating operations of determining a communication failure of a power converter and a battery management system by an integrated central control unit (ICU) of a vehicle according to an embodiment.

FIG. 6 is a flowchart illustrating operations of an ICU provided in a power control device of a vehicle according to an embodiment.

Operations of determining a communication failure in the power converter by the ICU are described below.

The power converter 131 periodically transmits a message for notifying the ICU 133 of a communication state. For example, a period may be 10 ms.

The ICU 133 communicates with the power converter 131 and determines whether the message transmitted by the power converter 131 is received (201).

When it is determined that the message is received from the power converter 131 (Yes in operation 201), the ICU 133 determines that the communication state of the power converter 131 is in a normal state and initializes information related to message receipt (202).

Here, the determination that the communication state of the power converter 131 is in a normal state may include determining that a hardware of the first communication module 131*a* provided in the power converter 131 is in a normal state and determining that a communication line connected to the first communication module 131*a* is in a normal state.

When it is determined that the message is not received from the power converter 131 (No in operation 201), the ICU 133 identifies a period of time that the message is not received (203) and compares the identified period of time and a set period of time (204).

When the identified period of time is greater than or equal to the set period of time (Yes in operation 204), the ICU 133 determines that communication with the power converter may not be performed (205) and transmits failure information about the communication failure in the power converter to the third distributor 132*c* (206).

The ICU 133 may also transmit the failure information about the communication failure in the power converter to the second distributor 132*b*.

When it is determined that the identified period of time is less than the set period of time (No in operation 204), the ICU 133 increases the period of time and stores the increased period of time (207).

More specifically, in an assumption that the power converter 131 transmits a first message at 10 ms, a second message at 20 ms, and a third message at 30 ms, when it is determined that the first message is not received, the ICU 133 increases the period of time that the message is not received to 10 ms, and stores the increased period of time. Also, when it is determined that the second message is not received, the ICU 133 increases the period of time that the message is not received to 20 ms in total and stores the increased period of time, and when it is determined that the third message is not received, the ICU 133 increases the period of time that the message is not received to 30 ms in total and stores the increased period of time.

When it is determined that a message is not received in a current period, the ICU 133 determines again whether a message transmitted by the power converter in a next period is received. When it is determined that the message of the next period is received, the ICU 133 initializes a stored period of time that the message is not received.

When it is determined that the message of the next period is not received, the ICU 133 identifies the stored period of time that the message is not received. When the identified period of time is greater than or equal to a set period of time, the ICU 133 determines that the power converter may not perform communication, and when the identified period of time is less than the set period of time, the ICU 133 repeats increasing the period of time that the message is not received and storing the increased period of time.

Here, the set period of time may be set as five times a preset period to reduce a sensitivity of the ICU 133.

The set period of time may be changed in a vehicle manufacturing process or by a user.

Operations of determining a communication failure in the BMS by the ICU are described below with reference to FIG. 6.

The BMS 134 periodically transmits a message for notifying the ICU 133 of a communication state. For example, a period may be preset and may be 10 ms.

The ICU 133 communicates with the BMS 134 and determines whether the message transmitted by the BMS 134 is received (201).

When it is determined that the message is received from the BMS 134 (Yes in operation 201), the ICU 133 determines that the communication state of the BMS 134 is in a normal state and initializes information related to message receipt (202).

Here, the determination that the communication state of the BMS 134 is in a normal state may include determining that a hardware of the second communication module 134*a* provided in the BMS 134 is in a normal state and determining that a communication line connected to the second communication module 134*a* is in a normal state.

When it is determined that the message is not received from the BMS 134 (No in operation 201), the ICU 133 identifies a period of time that the message is not received (203) and compares the identified period of time and a set period of time (204).

When the identified period of time is greater than or equal to the set period of time (Yes in operation 204), the ICU 133 determines that communication with the BMS 134 may not be performed (205) and transmits failure information about the communication failure in the BMS to the third distributor 132*c* (206).

The ICU 133 may also transmit the failure information about the communication failure in the BMS 134 to the second distributor 132*b*.

When it is determined that the identified period of time is less than the set period of time (No in operation 204), the ICU 133 increases the period of time and stores the increased period of time (207).

When it is determined that a message is not received in a current period, the ICU 133 determines again whether a message transmitted by the BMS in a next period is received. When it is determined that the message of the next period is received, the ICU 133 initializes a stored period of time that the message is not received.

When it is determined that the message of the next period is not received, the ICU 133 identifies the stored period of time that the message is not received. When the identified period of time is greater than or equal to a set period of time, the ICU 133 determines that the BMS 134 may not perform communication, and when the identified period of time is less than the set period of time, the ICU 133 repeats increasing the period of time that the message is not received and storing the increased period of time.

Here, the set period of time may be set as five times a preset period to reduce a sensitivity of the ICU 133.

The set period of time may be changed in a vehicle manufacturing process or by a user.

As such, when a message is not received from at least one of the power converter 131 or the BMS 134 for a set period of time, the ICU 133 determines that a communication failure occurs due to a 'time out'.

The ICU 133 may determine whether the power converter 131 and the BMS 134 are required while the vehicle is traveling and may stop determining whether a communication failure occurs in a device determined to be unrequired.

The ICU 133 may determine whether the power converter 131 and the BMS 134 are supplied with power while the vehicle is traveling and may stop determining whether a communication failure occurs in a device which is not powered.

Figure 7:
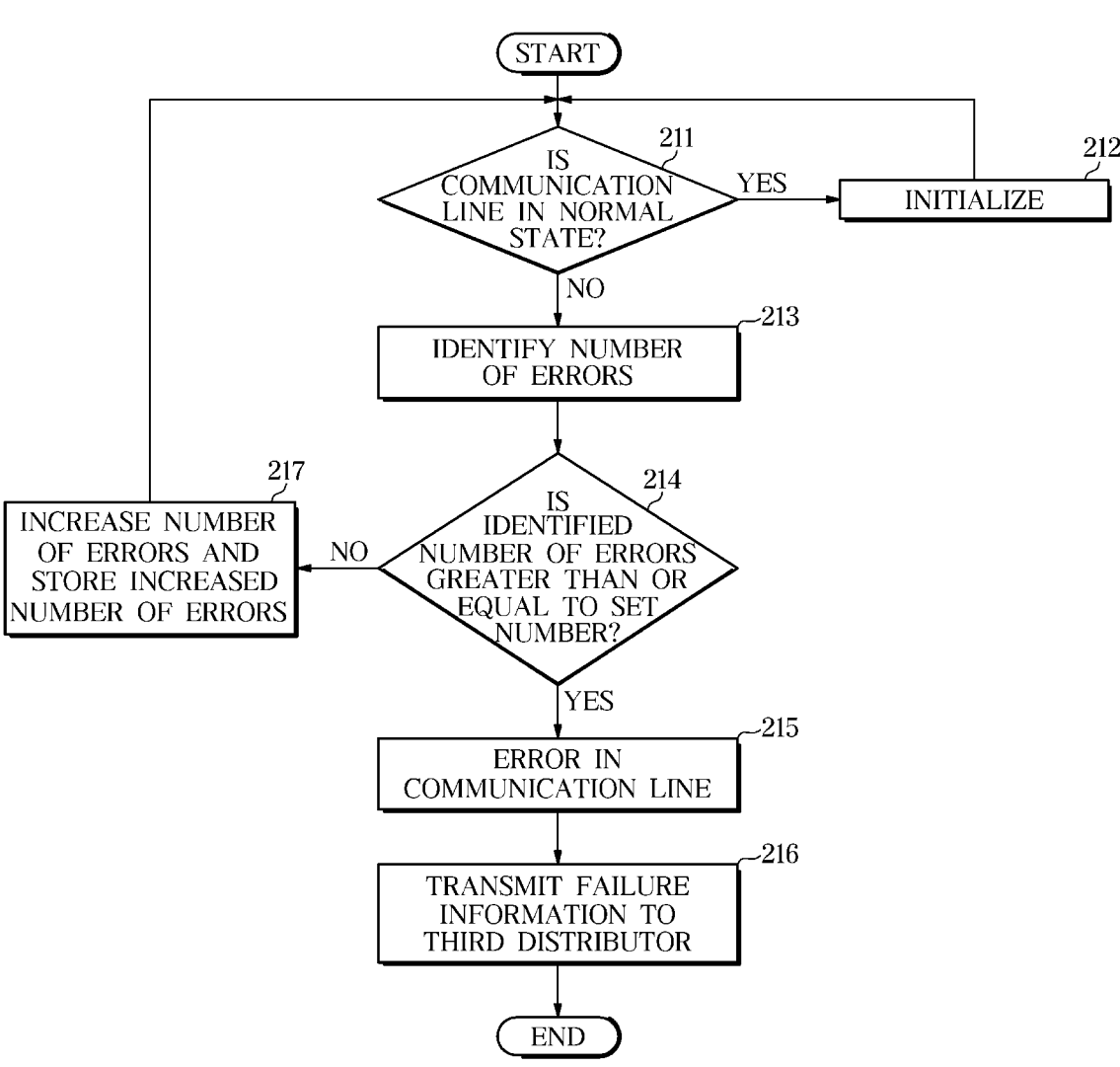
FIG. 7 is a flowchart illustrating operations of determining a failure in a communication line of a second communication network and a fourth communication network by an ICU of a vehicle according to an embodiment.

FIG. 7 is a flowchart illustrating operations of an ICU provided in a power control device of a vehicle according to an embodiment.

Operations of determining a failure in a communication line of the second communication network by the ICU are described below.

The ICU 133 determines whether a communication line of the second communication network 82 is in a normal state (211).

The ICU 133 may identify a signal of the communication line of the second communication network 82 and may determine whether the communication line of the second communication network 82 is in a normal state based on the identified signal.

For example, by determining whether the signal of the communication line of the second communication network 82 is different from a signal received from the steering device or the brake device, the ICU 133 may determine whether the communication line of the second communication network 82 is in a normal state.

As another example, by determining whether the signal of the communication line of the second communication network 82 is out of normal range, the ICU 133 may determine whether the communication line of the second communication network 82 is in a normal state. Here, a signal in a normal range may be a pre-stored signal.

When it is determined that the communication line of the second communication network 82 is in a normal state (Yes in operation 211), the ICU 133 initializes the stored number of errors (212).

When it is determined that the communication line of the second communication network 82 is not in a normal state (No in operation 211), i.e., when the communication line of the second communication network 82 is determined as an error state, the ICU 133 identifies the number of errors, i.e., the number of times determined as being the error state (213) and determines whether the identified number of errors is greater than or equal to a set number (214).

When it is determined that the identified number of errors is greater than or equal to the set number (Yes in operation 214), the ICU 133 determines that an error or short-circuit occurs in the communication line of the second communication network 82 (215) and transmits failure information of the communication line of the second communication network 82 to the third distributor 132*c* (216).

The ICU 133 may also transmit the failure information of the communication line of the second communication network 82 to the second distributor 132*b*.

When it is determined that the identified number of errors is less than the set number, the ICU 133 increases the number of errors and stores the increased number of errors (217).

The ICU 133 repeats determining whether an error occurs in the communication line in a next period.

More specifically, the ICU 133 periodically determines whether the communication line of the second communication network 82 is in a normal state. When an error is determined at 10 ms, the ICU 133 increases the number of errors to 1 and stores the number of errors as 1. When an error is determined at 20 ms, the ICU 133 increases the number of errors to 2 and stores the number of errors as 2.

When an error in a communication line is determined in a current period, the ICU 133 determines again whether an error in the communication line occurs in the next period. When the communication line is determined as a normal state in the next period, the ICU 133 initializes the number of errors.

Operations of determining a failure in a communication line of the fourth communication network by the ICU are described below with reference to FIG. 7.

The ICU 133 determines whether a communication line of the fourth communication network 84 is in a normal state (211).

The ICU 133 may identify a signal of the communication line of the fourth communication network 84 and may determine whether the communication line of the fourth communication network 84 is in a normal state based on the identified signal.

For example, by determining whether the signal of the communication line of the fourth communication network 84 is different from a signal received from the BMS 134, the ICU 133 may determine whether the communication line of the fourth communication network 84 is in a normal state.

As another example, by determining whether the signal of the communication line of the fourth communication network 84 is out of normal range, the ICU 133 may determine whether the communication line of the fourth communication network 84 is in a normal state. Here, a signal in a normal range may be a pre-stored signal.

When it is determined that the communication line of the fourth communication network 84 is in a normal state (Yes in operation 211), the ICU 133 initializes the stored number of errors (212).

When it is determined that the communication line of the fourth communication network 84 is not in a normal state (No in operation 211), i.e., when the communication line of the fourth communication network 84 is determined as an error state, the ICU 133 identifies the number of errors, i.e., the number of times determined as being the error state (213) and determines whether the identified number of errors is greater than or equal to a set number (214).

When it is determined that the identified number of errors is greater than or equal to the set number (Yes in operation 214), the ICU 133 determines that an error or short-circuit occurs in the communication line of the fourth communication network 84 (215) and transmits failure information of the communication line of the fourth communication network 84 to the third distributor 132*c* (216).

The ICU 133 may also transmit the failure information of the communication line of the fourth communication network 84 to the second distributor 132*b*.

When it is determined that the identified number of errors is less than the set number (No in operation 214), the ICU 133 increases the number of errors and stores the increased number of errors (217).

The ICU 133 repeats determining whether an error occurs in the communication line in a next period.

When an error in a communication line is determined in a current period, the ICU 133 determines again whether an error in the communication line occurs in the next period. When the communication line is determined as a normal state in the next period, the ICU 133 initializes the number of errors.

Figure 8:
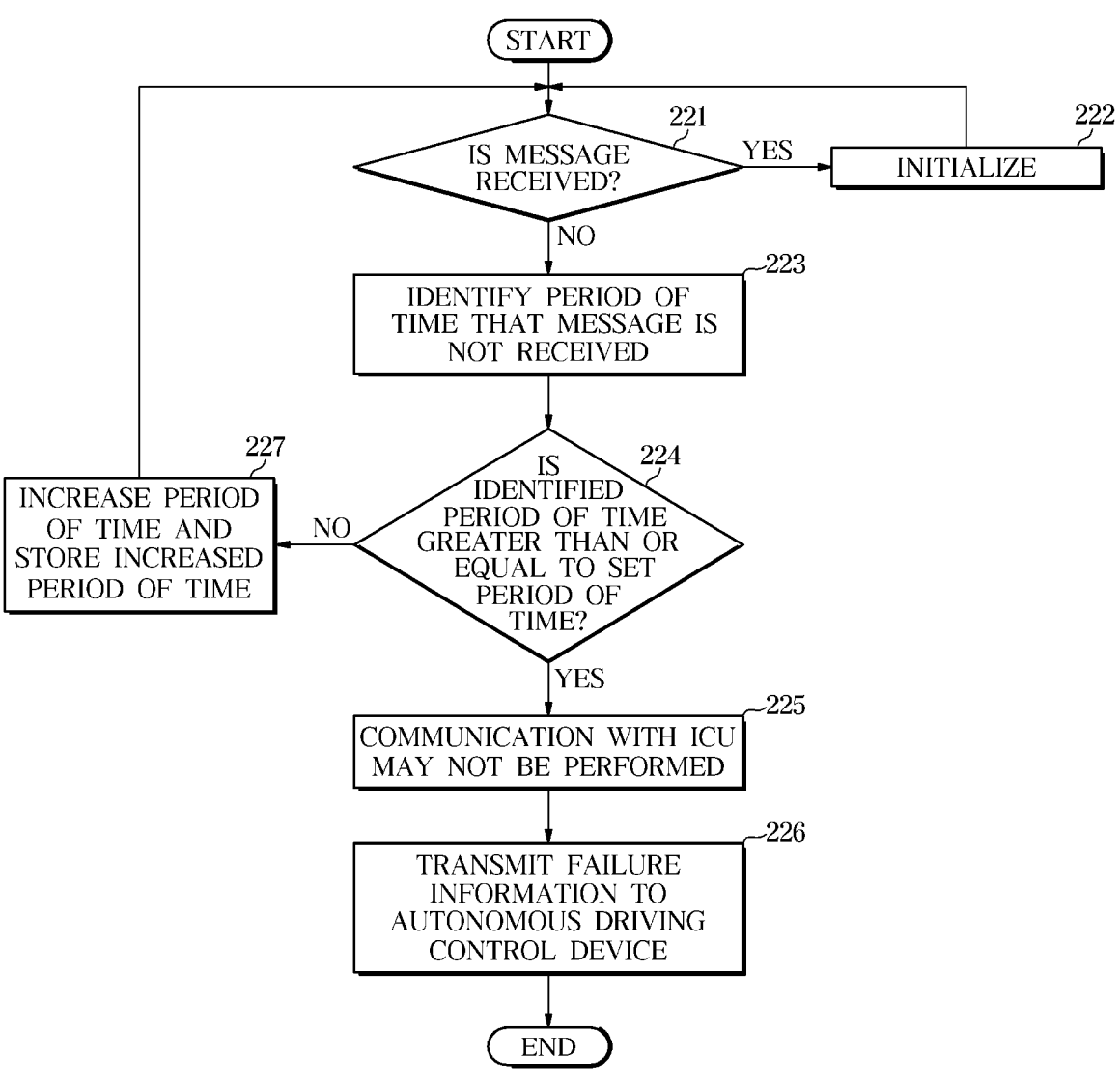
FIG. 8 is a flowchart illustrating operations of a third distributor of a power control device of a vehicle according to an embodiment.

FIG. 8 is a flowchart illustrating operations of a third distributor of a power control device of a vehicle according to an embodiment.

The ICU 133 periodically transmits a message for notifying the third distributor 132*c* of a communication state. For example, a period may be 10 ms.

The third distributor 132*c* communicates with the ICU 133 and determines whether the message transmitted by the ICU 133 is received (221).

When it is determined that the message is received from the ICU 133 (Yes in operation 221), the third distributor

132*c* determines that a communication state of the ICU 133 is in a normal state and initializes information related to message receipt (222).

Here, the determination that the communication state of the ICU 133 is in a normal state may include determining that a hardware of the third communication module 133*a* provided in the ICU 133 is in a normal state and determining that a communication line connected to the third communication module 133*a* is in a normal state.

When it is determined that the message is not received from the ICU 133 (No in operation 221), the third distributor 132*c* identifies a period of time that the message is not received (223) and compares the identified period of time and a set period of time (224).

When the identified period of time is greater than or equal to the set period of time (Yes in operation 224), the third distributor 132*c* determines that communication with the ICU 133 may not be performed (225) and transmits failure information about the communication failure in the ICU 133 to the autonomous driving control device 70 (226).

When it is determined that the identified period of time is less than the set period of time (No in operation 224), the third distributor 132*c* increases the period of time and stores the increased period of time (227).

More specifically, in an assumption that the ICU 133 transmits a first message at 10 ms, a second message at 20 ms, and a third message at 30 ms, when it is determined that the first message is not received, the third distributor 132*c* increases the period of time that the message is not received to 10 ms and stores the increased period of time as 10 ms. Also, when it is determined that the second message is not received, the third distributor 132*c* increases the period of time that the message is not received to 20 ms in total and stores the increased period of time as 20 ms, and when it is determined that the third message is not received, the third distributor 132*c* increases the period of time that the message is not received to 30 ms in total and stores the increased period of time as 30 ms.

When it is determined that a message is not received in a current period, the third distributor 132*c* determines again whether a message transmitted by the ICU 133 in a next period is received. When it is determined that the message of the next period is received, the third distributor 132*c* initializes a stored period of time that the message is not received.

When it is determined that the message of the next period is not received, the third distributor 132*c* identifies the stored period of time that the message is not received. When the identified period of time is greater than or equal to a set period of time, the third distributor 132*c* determines that the ICU 133 may not perform communication, and when the identified period of time is less than the set period of time, the third distributor 132*c* repeats increasing the period of time that the message is not received and storing the increased period of time.

Here, the set period of time may be set as five times a preset period to reduce a sensitivity of the third distributor.

The set period of time may be changed in a vehicle manufacturing process or by a user.

Figure 9:
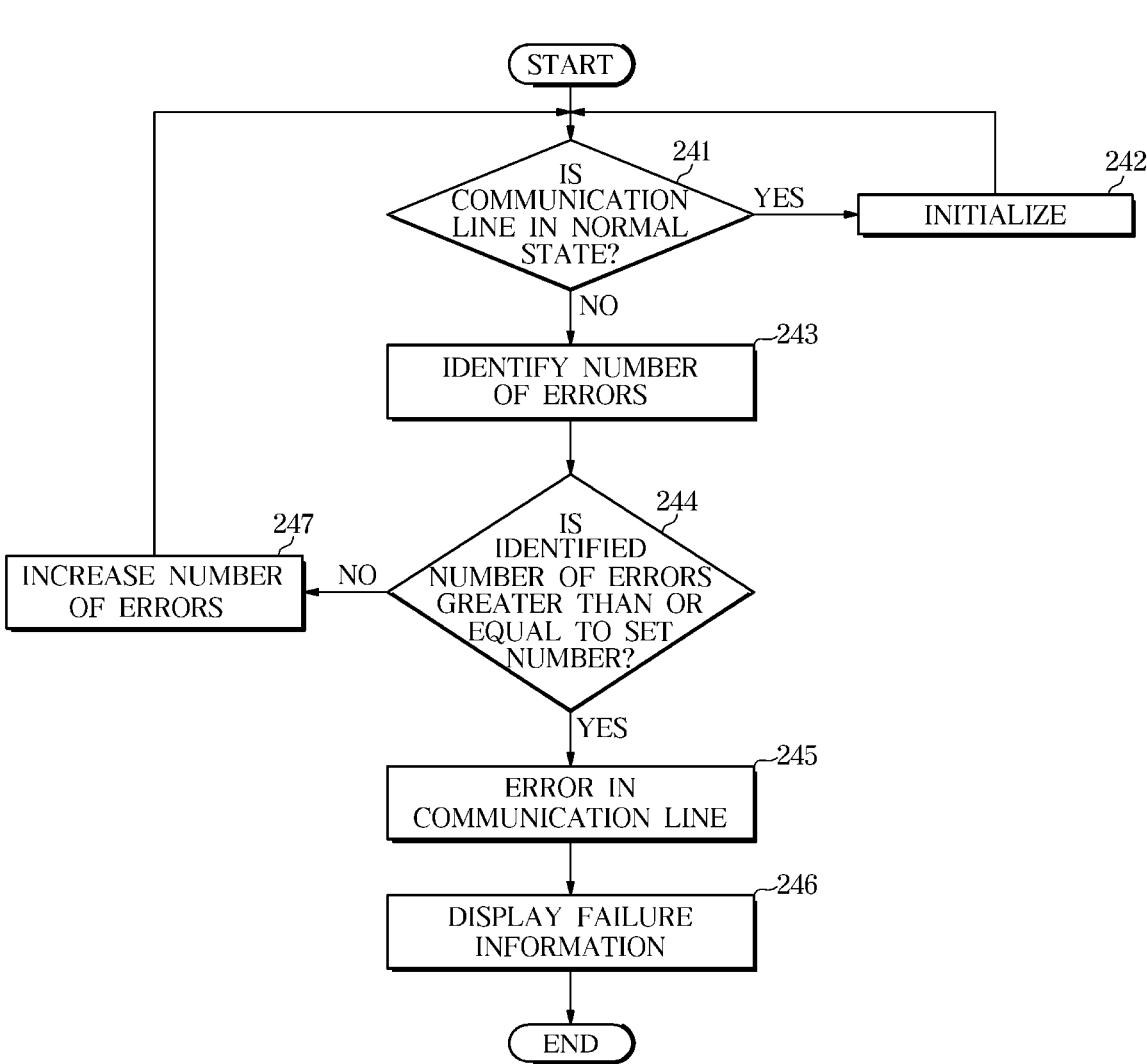
FIG. 9 is a flowchart illustrating operations of an autonomous driving control device of a vehicle according to an embodiment.

FIG. 9 is a flowchart illustrating operations of an autonomous driving control device of a vehicle according to an embodiment.

The autonomous driving control device 70 determines whether a communication line of the third communication network 83 is in a normal state (241).

The autonomous driving control device 70 may identify a signal of the communication line of the third communication network 83 and may determine whether the communication line of the third communication network 83 is in a normal state based on the identified signal.

For example, by determining whether the signal of the communication line of the third communication network 83 is different from a signal received from at least one of the ICU 133, the second distributor 132*b*, or the third distributor 132*c*, the autonomous driving control device 70 may determine whether the communication line of the third communication network 83 is in a normal state.

As another example, by determining whether the signal of the communication line of the third communication network 83 is out of normal range, the autonomous driving control device 70 may determine whether the communication line of the third communication network 83 is in a normal state. Here, a signal in a normal range may be a pre-stored signal.

When it is determined that the communication line of the third communication network 83 is in a normal state (Yes in operation 241), the autonomous driving control device 70 initializes the stored number of errors (242).

When it is determined that the communication line of the third communication network 83 is not in a normal state (No in operation 241), i.e., when the communication line of the third communication network 83 is determined as an error state, the autonomous driving control device 70 identifies the number of errors, i.e., the number of times determined as being the error state (243) and determines whether the identified number of errors is greater than or equal to a set number (244).

When it is determined that the identified number of errors is greater than or equal to the set number (Yes in operation 244), the autonomous driving control device 70 may determine that an error or short-circuit occurs in the communication line of the third communication network 83 (245) and may display failure information of the communication line of the fourth communication network 84 through a display (246).

When it is determined that an error or short-circuit occurs in the communication line of the fourth communication network 84, the autonomous driving control device 70 may hand over control of the vehicle to a user, thereby preventing a vehicle accident.

When it is determined that the identified number of errors is less than the set number (No in operation 244), the autonomous driving control device 70 increases the number of errors and stores the increased number of errors (247).

The autonomous driving control device 70 repeats determining whether an error occurs in the communication line of the fourth communication network 84 in a next period.

More specifically, the autonomous driving control device 70 periodically determines whether a communication line of the fourth communication network 84 is in a normal state. When an error is determined at 10 ms, the autonomous driving control device 70 increases the number of errors to 1 and stores the number of errors as 1. When an error is determined at 20 ms, the autonomous driving control device 70 increases the number of errors to 2 and stores the number of errors as 2.

When an error in a communication line of the fourth communication network 84 is determined in a current period, the autonomous driving control device 70 determines again whether an error in the communication line of the fourth communication network 84 occurs in the next period. When the communication line is determined as a normal state in the next period, the autonomous driving control device 70 initializes the number of errors.

According to the embodiments of the disclosure, failure information about a point and type of failure in a communication module or a communication line and failure response information may be output, thereby allowing a user to easily recognize the communication failure information and cope with the failure quickly.

As is apparent from the above, according to the embodiments of the disclosure, a failure in a communication module and a communication line connecting a power control device, a steering device, a brake device, and an autonomous driving control device can be determined quickly and easily.

That is, according to the embodiments of the disclosure, during autonomous driving control, a communication line failure or a hardware failure in a communication module of a device closely related to the autonomous driving control can be determined in a timely manner.

According to the embodiments of the disclosure, failure information about a failure point and a failure type of a communication module or a communication line can be transmitted to an autonomous driving control device, thereby enabling the autonomous driving control device to robustly respond to communication failures during autonomous driving control.

According to the embodiments of the disclosure, a vehicle accident can be prevented by handing over control of a vehicle to a user in an event of communication failure during autonomous driving control.

According to the embodiments of the disclosure, failure information about a failure point and a failure type of a communication module or a communication line and failure response information can be output, thereby allowing a user to easily recognize the communication failure information and cope with the communication failure quickly.

That is, according to the embodiments of the disclosure, a vehicle accident caused by communication failures can be prevented in advance, and human and material damages can be prevented.

According to the embodiments of the disclosure, quality of a power control device, an autonomous driving control device, and a vehicle can be improved, and thus user satisfaction and user convenience can be enhanced.

Meanwhile, embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored, for example, a read only memory (ROM), a random access memory (RAM), magnetic tapes, magnetic disks, flash memories, an optical recording medium, and the like.

Although embodiments have been described for illustrative purposes, those skilled in the art will appreciate that various modifications, additions, and substitutions are possible, without departing from the scope and spirit of the disclosure. Therefore, embodiments have not been described for limiting purposes.

What is claimed is:

1. A power control device comprising:
a power converter configured to convert a first voltage of
    a first battery to a second voltage lower than the first
    voltage of the first battery and to supply a power via the
    second voltage;

a power distributor configured to distribute the power supplied from the power converter to a plurality of low-power loads, wherein the plurality of low-power loads comprises an autonomous driving control device; and an integrated central control unit (ICU) configured to be connected to the power converter, the power distributor, and the autonomous driving control device through a plurality of communication networks, to detect a failure in at least one of the plurality of communication networks, and to transmit failure information comprising at least one of a point where the failure occurred or a type of the failure to the autonomous driving control device.

2. The power control device of claim 1, wherein the ICU is configured to:

be connected to the power converter through a first communication network of the plurality of communication networks;

identify a period of time that a message is not received from the power converter; and based on the identified period of time being greater than or equal to a set period of time, determine that a hardware failure occurs in a first communication module or a disconnection occurs in a communication line connected to the first communication module.

3. The power control device of claim 1, wherein the ICU is configured to:

be connected to a steering device and a brake device through a second communication network of the plurality of communication networks;

determine whether a communication line of the second communication network is in an error state based on a signal received through the second communication network; and based on a number of times the error state has been detected as being greater than or equal to a set number, determine that an error or a short-circuit occurs in the communication line of the second communication network.

4. The power control device of claim 3, wherein the power distributor comprises:

a first distributor configured to distribute the power supplied from the power converter;

a second distributor configured to supply the power distributed from the first distributor to the autonomous driving control device, the steering device, and the brake device and configured to be connected to the ICU through a third communication network of the plurality of communication networks; and a third distributor configured to supply the power distributed from the second distributor to the autonomous driving control device, the steering device, and the brake device and configured to be connected to the ICU through the third communication network.

5. The power control device of claim 4, wherein the third distributor is configured to:

identify a period of time that a message is not received from the ICU; and based on the identified period of time being greater than or equal to a set period of time, determine that a hardware failure occurs in a third communication module provided in the ICU or a disconnection occurs in a communication line connected to the third communication module.

6. The power control device of claim 4, wherein, based on the failure information being received from the ICU, the third distributor is configured to transmit the failure information to the autonomous driving control device.

7. The power control device of claim 1, further comprising a battery management system (BMS) comprising a second communication module connected to a fourth communication network of the plurality of communication networks, the BMS being configured to control charging of a second battery using the power supplied from the power converter, wherein the ICU is configured to:

determine whether a communication line of the fourth communication network is in an error state based on a signal received through the fourth communication network; and based on a number of times determined as being the error state being greater than or equal to a set number, determine that an error or a short-circuit occurs in the communication line of the fourth communication network.

8. The power control device of claim 7, wherein the ICU is configured to:

identify a period of time that a message is not received from the BMS; and based on the identified period of time being greater than or equal to a set period of time, determine that a hardware failure occurs in the second communication module or a disconnection occurs in a communication line connected to the second communication module.

9. The power control device of claim 1, wherein the autonomous driving control device is configured to hand over control of a vehicle to a user based on detection of a failure in the at least one of the plurality of communication networks, and wherein the type of the failure comprises at least one of a disconnection in a communication line, a short circuit in a communication line, an error in a communication line, or a failure of a communication module.

10. A vehicle comprising:

a power converter configured to convert a first voltage of a first battery to a second voltage lower than the first voltage of the first battery and to supply a power via the second voltage;

a power distributor configured to distribute and supply the power supplied from the power converter to an autonomous driving control device, a steering device, and a brake device;

a first communication network configured to be connected to the power converter;

a second communication network configured to be connected to the brake device and the steering device;

a third communication network configured to be connected to the autonomous driving control device and the power distributor; and an integrated central control unit (ICU) configured to be connected to the first communication network, the second communication network, and the third communication network, to detect a failure in at least one of a plurality of communication networks including the first communication network, the second communication network, and the third communication network, and to transmit failure information comprising at least one of a point where the failure occurred or a type of the failure to the autonomous driving control device, wherein, based on the failure information being received, the autonomous driving control device is configured to control display of the failure information and failure response information.

11. The vehicle of claim 10, wherein the ICU is configured to:

be connected to the power converter through the first communication network;

identify a period of time that a message is not received from the power converter; and based on the identified period of time being greater than or equal to a set period of time, determine that a hardware failure occurs in a first communication module or a disconnection occurs in a communication line connected to the first communication module.

12. The vehicle of claim 10, wherein the ICU is configured to:

determine whether a communication line of the second communication network is in an error state based on a signal received through the second communication network; and determine that an error or a short-circuit occurs in the communication line of the second communication network based on a number of times the error state has been detected as being greater than or equal to a set number.

13. The vehicle of claim 12, wherein the power distributor is configured to doubly supply the power supplied from the power converter to the autonomous driving control device, the steering device, and the brake device.

14. The vehicle of claim 13, wherein the power distributor is configured to:

identify a period of time that a message is not received from the ICU; and based on the identified period of time being greater than or equal to a set period of time, determine that a hardware failure occurs in a third communication module provided in the ICU or a disconnection occurs in a communication line connected to the third communication module.

15. The vehicle of claim 13, wherein, based on the failure information being received from the ICU, the power distributor is configured to transmit the failure information to the autonomous driving control device.

16. The vehicle of claim 10, further comprising:

a second battery;

a battery management system (BMS) configured to control charging of the second battery using the power supplied from the power converter; and a fourth communication network connected to the BMS.

17. The vehicle of claim 16, wherein the ICU is configured to:

identify a period of time that a message is not received from the BMS; and based on the identified period of time being greater than or equal to a set period of time, determine that a hardware failure occurs in a second communication module provided in the BMS or a disconnection occurs in a communication line connected to the second communication module.

18. The vehicle of claim 16, wherein the ICU is configured to:

determine whether a communication line of the fourth communication network is in an error state based on a signal received through the fourth communication network; and determine that an error or a short-circuit occurs in the communication line of the fourth communication network based on a number of times determined as being the error state being greater than or equal to a set number.

19. The vehicle of claim 16, wherein the autonomous driving control device is configured to control a power supply of the second battery based on a determination that the failure information being failure information of communication with the power converter.

20. A vehicle comprising:

a power converter configured to convert a first voltage of a first battery to a second voltage lower than the first voltage of the first battery and to supply a power via the second voltage;

a power distributor configured to distribute and supply the power supplied from the power converter to an autonomous driving control device, a steering device, and a brake device;

a first communication network configured to be connected to the power converter;

a second communication network configured to be connected to the brake device and the steering device;

a third communication network configured to be connected to the autonomous driving control device and the power distributor; and an integrated central control unit (ICU) configured to be connected to the first communication network, the second communication network, and the third communication network, to determine a first failure in a first communication module provided in the power converter or a second failure in a communication line of the first communication network, the second communication network, or the third communication network, and to transmit failure information about the first failure or the second failure to the autonomous driving control device, wherein, based on the failure information about the first failure or the second failure being received, the autonomous driving control device is configured to control display of the failure information about the first failure or the second failure and failure response information; and wherein the autonomous driving control device is configured to:

determine whether the communication line of the third communication network is in an error state based on a signal received through the third communication network;

determine that an error or a short-circuit occurs in the communication line of the third communication network based on a number of times determined as being the error state being greater than or equal to a set number; and hand over control of the vehicle to a user in response to determining that the error or the short-circuit occurs.

* * * * *